United States Patent [19]

Nakazato

[11] Patent Number: 4,516,870
[45] Date of Patent: May 14, 1985

[54] GRIDDLE CLEANING DEVICE

[76] Inventor: Teiji Nakazato, 9-12, Higashi Azabu 1-chome, Minato-ku, Tokyo, Japan

[21] Appl. No.: 533,446

[22] Filed: Sep. 19, 1983

[51] Int. Cl.³ .............................................. A46B 11/06
[52] U.S. Cl. ................................. 401/146; 15/143 R; 15/160; 401/149; 401/15; 401/42; 401/188 R; 401/46; 401/47
[58] Field of Search .................. 134/6, 28, 29; 15/104.94, 160, 143 R; 401/15, 44, 45, 46, 47, 289, 42, 146, 149, 188 R

[56] References Cited

U.S. PATENT DOCUMENTS

| 358,875 | 3/1887 | Nichols | 401/15 |
|---|---|---|---|
| 1,674,207 | 6/1928 | Krill | 401/15 X |
| 1,715,907 | 6/1929 | Dragelin | 401/15 |
| 2,824,323 | 2/1958 | Tos et al. | 15/160 X |
| 2,975,804 | 3/1961 | Dunn et al. | 401/46 X |
| 3,163,880 | 1/1965 | Johnson | 401/45 X |
| 3,989,390 | 11/1976 | Thorner | 401/42 |
| 4,056,863 | 11/1977 | Gunjian | 15/160 |
| 4,171,169 | 10/1979 | Williams | 401/289 X |

Primary Examiner—Marc L. Caroff
Attorney, Agent, or Firm—Thomas & Kennedy

[57] ABSTRACT

A griddle cleaning device which is capable of cleaning griddles with high efficiency and with a minimum of labor, and which is very good from the sanitary standpoint. The device includes a brush having a base with an outlet opening, a multitude of bristles secured to the base, and a hollow handle connected with the base. The handle has one end in communication with the outlet opening in the base, and the other end coupled with a hose. The hose is adapted to be placed in selective communication with a detergent tank, a water source, and a rinse tank under the control of a control unit so that the bristles are fed with one of a cleaning liquid, water and a rinsing liquid through the hose, the hollow interior of the brush handle and the outlet opening. The device also includes a sensor attachable to the upper surface of a griddle and connected to the control unit for detecting detergent concentration in the rinsing water.

7 Claims, 6 Drawing Figures

GRIDDLE CLEANING DEVICE

BACKGROUND OF THE INVENTION

This invention relates to a griddle cleaning device for cleaning griddles which are used to cook hamburgers, pancakes, bacon and the like.

Generally, griddles are used for cooking hamburgers, pancakes and the like, and during such cooking, parts of cooking materials such as meat are often burned and stuck to the griddles. Those burned and stuck to the griddles have to be removed after completion of the cooking, and detergents are used for the purpose of facilitating such a removal. However, detergents remaining on the griddles after washing are undesirable from the viewpoint of foodstuff sanitation and hence have been removed by hand work using a whetstone, metal brushes or the like. Thus, such a removing operation has generally taken time as much as about from 40 to 50 minutes.

SUMMARY OF THE INVENTION

In view of the above, an object of the present invention is to provide a novel and improved device for cleaning griddles which is capable of performing cleaning operation with high efficiency and which is very good for foodstuff sanitation.

In order to achieve the above object, the present invention provides a griddle cleaning device which comprises a brush having a base with an outlet opening, a multitude of bristles secured to the base, a hollow handle connected with the base and having one end in communication with the outlet opening in the base and the other end coupled with a hose, and means for selectively feeding one of a cleaning liquid, water and a rinsing liquid to the hose.

The above and other objects, features and advantages of the present invention will become apparent from the following detailed description of a preferred embodiment when taken in conjunction with the accompanying drawings.

DESCRIPTION OF THE PREFERRED EMBODIMENT

Figure 1:
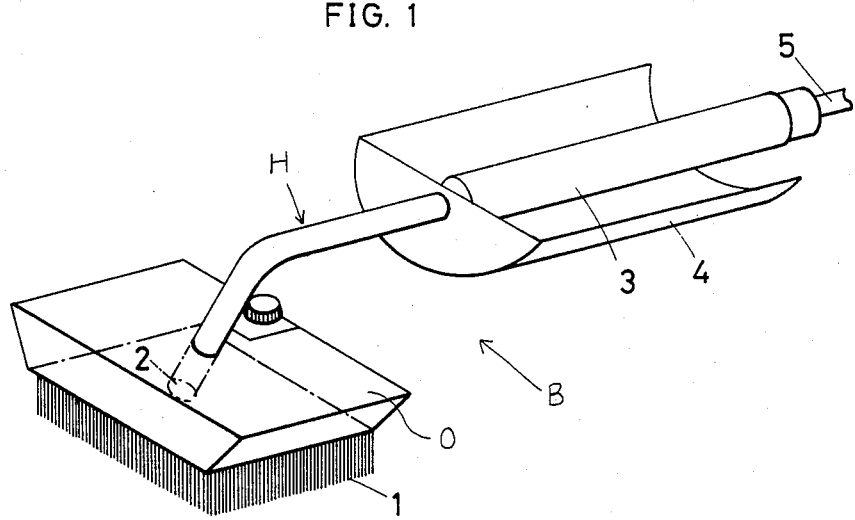
FIG. 1 is a perspective view of a brush according to the present invention.
Figure 2:
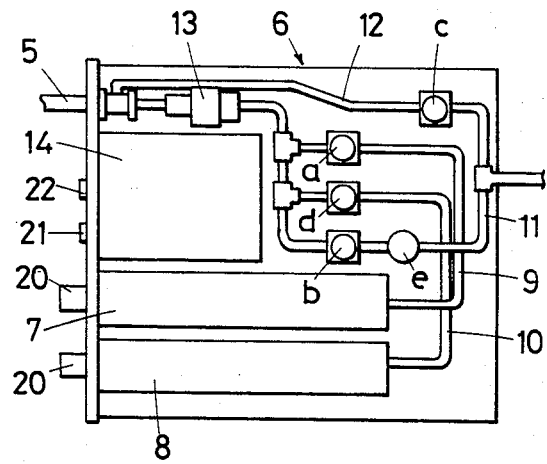
FIG. 2 is a plan view showing the interior of a control box according to the present invention.

Referring to the drawings and first to FIGS. 1 and 2, there is shown a griddle cleaning device of the present invention which includes a brush, generally indicated at B, and a control box or unit 6 for controlling operation of the brush B.

The brush B has a base 0 with a discharge or outlet opening 2 formed therethrough, a multitude of bristles 1 formed of heat- and chemical-resisting material and secured to the base 0, and a handle H having a grip portion 3, at which an operator grips the handle, as shown in FIG. 1. A cover 4 is attached to the handle for protecting the hands of the operator. The handle H is formed of a hollow rod having an outlet end inserted into the outlet opening 2 in the base 1 and an inlet and coupled with a flexible hose 5 at its one end, the hose being connected at its other end to the control box 6.

As shown in FIG. 2, in the control box 6, there are arranged a detergent tank 7 for storing a detergent such as "Griddle Cleaner" sold by the Johnson Co., Ltd. and containing a 20% of caustic soda, and a rinse tank 8 for storing a rinsing liquid such as "Griddle Rinse" sold by the Johnson Co., Ltd. and containing a 2% of acetic acid. A conduit 9 and a conduit 10 are extending from the detergent tank 7 and the rinse tank 8, respectively, and connected in parallel with a water conduit 11. A first electromagnetic valve a and a second electromagnetic valve d are interposed in the conduits 9 and 10, respectively. An electromagnetic valve b and a flow control valve e for controlling the flow rate of water passing through the conduit 11 are interposed in series in the water conduit 11 at a location upstream of its connection with the conduits 9 and 10. The water conduit 11 is connected to a water pump 13 which is in turn connected to the hose 5 leading to the brush handle H. Also, a by-pass conduit 12 having an electromagnetic valve c therein is connected with the hose 5 in parallel relation with the water conduit 11. The conduits 11 and 12 are combined to form a single conduit extending to a water source (not shown).

Figure 3:
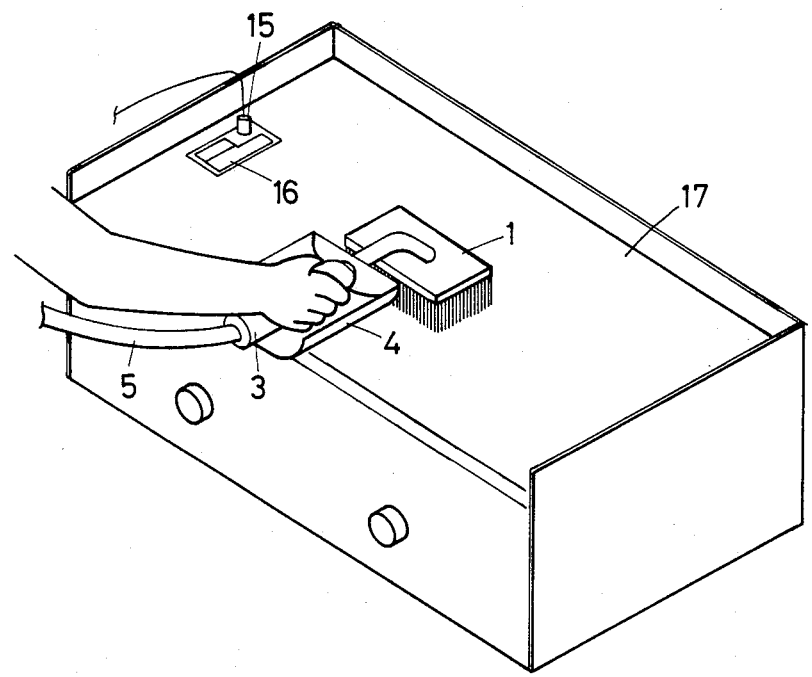
FIG. 3 is a view showing how to use the brush of FIG. 1 for cleaning of a griddle.
Figure 4:
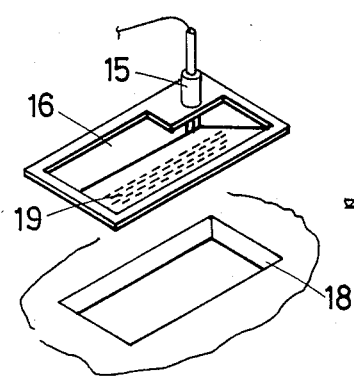
FIG. 4 is a perspective view showing a dust hole in the top surface of the griddle and a concentration-detecting box removed from the dust hole.
Figure 5:
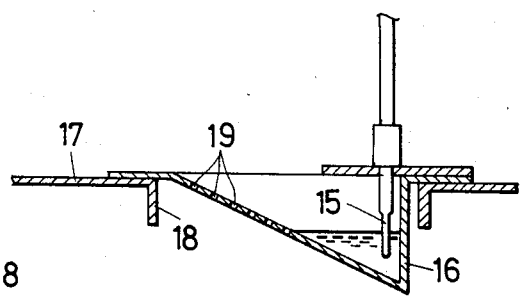
FIG. 5 is a cross-sectional view showing tne concentration-detecting box fitted in the dust hole.

A power source and control section 14 is disposed within the control box 6 for controlling the operations of the respective electomagnetic valves a, b, c and d and a water pump 13. In order to provide control signals for alternatively actuating the electromagnetic valves c and d, there is a concentration sensor 15 connected to the power source and control secrion 14 for detecting the concentration of a detergent contained in the rinsing water as shown in FIG. 3. The sensor 15 is inserted into a concentration-detecting box 16 which is removably fitted in a dust hole 18 in the top surface of a griddle 17 and which is formed in its inclined bottom or at its vertical side walls with a plurality of water discharge apertures 19 so as to maintain the water stored therein at a constant level.

In FIG. 2, reference numeral 20 indicates water-level gages respectively provided in the tanks 7 and 8; reference numeral 21, a start switch; and reference numeral 22, a lamp.

Figure 6:
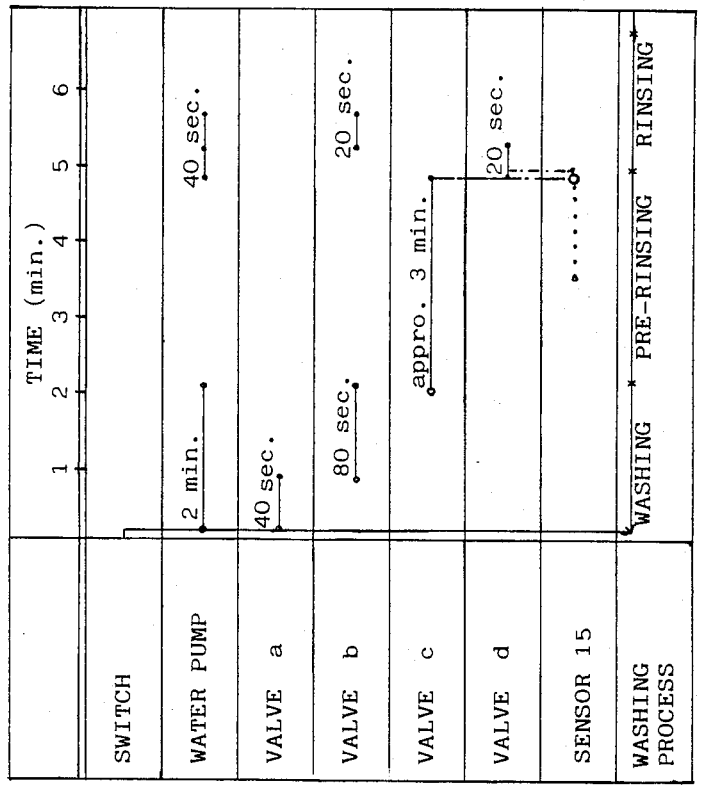
FIG. 6 is a chart showing the operations of component members of the invention with respect to the time elapsed.

FIG. 6 is a working chart illustrating the operations of the respective parts or components of the above-described embodiment with respect to the time elapsed wherein the electromagnetic valve a is held in an open condition for a period of time of 40 seconds after the start switch 21 has been turned on; that is, in an electrical sense, the electromagnetic valve a is closed by a pulse signal issued upon elapsing of 40 seconds after turning-on of the start switch 21. The electromagnetic valve b is held in an open condition for a period of time of 80 seconds after closure of the electromagnetic valve a; that is, in an electrical sense, the electromagnetic valve b is closed upon elapsing of 80 seconds after closure of the electromagnetic valve a. The electromagnetic valve c is operated to open upon closure of the electromagnetic valve b and to close by a pulse signal which is issued by the concentration sensor 15 when the sensor 15 has detected no presence of the detergent in the rinsing water. In fact, the valve c is generally operated to close in about 3 minutes after closure of the eletromagnetic valve b. Simultaneously with the generation of such a pulse signal by the concentration sensor 15, or one to two minutes later, the electromagnetic valve d is operated to open and then it is closed in twenty minutes by a pulse signal from the control section 14. The water pump 13 is started to operate when the start switch 21 is turned on, and stopped by a pulse signal developed upon closure of the electromagnetic valve b, and then driven to rotate by a pulse signal which acts to open the electromagnetic valve d, and finally stopped by a pulse signal which acts to close the electromagnetic valve b, as described above.

Now a description will be made of the operation of the embodiment as referred to above.

First, the concentration-detecting box 16 having the concentration sensor 15 inserted therein is installed in the dust hole 18 in the top of the griddle 17. Thereafter, with the brush 1 being placed on the top surface of the griddle 17, as illustrated in FIG. 3, the start switch 21 is turned on to operate a timer (not shown) provided in the power source and control section 14, and simultaneously with this, the electromagnetic valve a is operated to open and the water pump 13 is started to rotate so that the detergent stored in the tank 7 is drawn into the water pump 13 through the conduit 9 and the now opened electromagnetic valve a, and then delivered into the hose 5 passing through the interior of the hollow handle H to be discharged from the outlet opening 2 at one end of the handle H onto the top surface of the griddle 17 through the bristles 1. In this state, an operator, gripping the grip portion 3 of the brush handle H, can brush the dirty top surface of the griddle 17 with the detergent discharged from the outlet opening 2 so as to wash away and remove the dirty matters stuck to the griddle surface.

At an instant when the detergent of a volume of about 200 cc has been discharged after the elapse of time of about 40 seconds from the actuation of the start switch 21, the timer (not shown) in the power source and control section 14 acts to produce a pulse signal whereby the electromagnetic valve a is operated to close and the electromagnetic valve b is operated to open so as to supply cleaning water to the brush B through the water conduit 11, the flow control valve e, the now opened eletromagnetic valve b, the pump 13 and the hose 5, while controlling the flow rate of the water as desired by means of the flow control valve e. In this manner, the cleaning water is fed to the top surface of the griddle 17 through the brush handle H and mixed there with the detergent as previously supplied thereby to wash the griddle surface as the brush B is moved thereon.

Subsequently, when dirty water, after washing the griddle 17, has fully fallen down from the upper surface of the griddle after the elapse of time of 80 seconds or therearound from the actuation of the electromagnetic valve b, the timer (not shown) in the power source and control section 14 acts to generate a pulse signal whereby the electromagnetic valve b and the water pump 13 are both deactuated, and at the same time, the electromagnetic valve c is operated to open so that water is fed to the brush B through the conduit 12, by-passing the water conduit 11 and the pump 13, and hence discharged at the outlet opening 2 of the brush handle H onto the upper surface of the griddle 17, thereby rinsing the latter while the brush B is moved thereon by the operator. On this occasion, since the griddle 17 is disposed with its top surface inclined relative to the horizontal toward the dust hole 18, the rinsing water is caused under gravity to flow along the top surface of the griddle 17 into the dust hole 18 in which is fitted the concentration-detecting box 16. Thus, the water coming into the dust hole 18 enters the box 16 and is stored therein for a time and then goes out through the water discharge apertures 19 in the bottom of the box 16. In this case, it is to be noted that the concentration of the detergent contained in the water within the box 16 is detected by means of the concentration sensor 15 mounted in the box 16 so that when the detergent concentration in the water falls below a predetermined allowable limit, the sensor 15 detects this condition and generates a signal thereby the electromagnetic valve c is operated to close whereas the electromagnetic valve d is operated to open and the water pump 13 is driven to rotate so as to feed the brush B with a rinsing liquid from the tank 8 through the conduit 10, the now opened electromagnetic valve d, the pump 13 and the hose 5. The rinsing liquid thus fed to the brush B is discharged from the outlet opening 2 of the brush handle H onto the top surface of the griddle 17 and applied thereto by means of the brush B.

After application of the rinsing liquid over the griddle surface for a period of time of 20 seconds, the electromagnetic valve d is closed and, for the purpose of removing the rinsing liquid in the bristles 1, the electromagnetic valve b is then operated to open again for a period of time of 20 seconds so as to pass water through the bristles 1. Thereafter, the electromagnetic valve b is closed and at the same time, the water pump 13 is stopped to complete the cleaning operation.

Incidentally, it should be noted that it is not intended to limit the durations of deliveries of water, the detergent and the rinsing liquid as described above, but such durations may be altered as desired. Thus, for example, the detergent may be fed for a period of 10 seconds, and then cleaning water for a period of 30 seconds, and these processes may be alternatively repeated several times.

From the foregoing, it will be appreciated that the following advantages are brought about by the present invention as described above.

The cleaning operation can be performed in a highly efficient manner due to the fact that the detergent and cleaning water are discharged onto the top surface of the griddle 17 through the brush B during brushing operation. Also, in pre-rinsing operation, water can be discharged through the brush B onto the griddle surface while the brush B is moved thereon so that the detergent on the griddle surface can be positively removed within a short period of time. In the course of such a pre-rinsing operation, water, after washing away the detergent on the griddle surface, is stored in the concentration-detecting box 16 for a moment in order to detect the concentration of the detergent contained in the water, and at the time when the concentration thus detected is reduced below a predetermined certain level which is safe from the standpoint of foodstuff sanitation, the rinsing liquid is automatically discharged, in place of water, through the brush B onto the griddle surface and coated thereon by means of the brush B. Further, the operator's hands holding the grip portion 3 of the brush handle H are effectively protected from splashes of water or detergent by means of the cover 4, which is mounted on the brush handle H under the grip portion 3 so as to partially surround the latter. As a result, cleaning operation can be carried out with the griddle 17 being heated to a temperature of about 100° C. so as to provide a high working efficiency and a substantial saving of labor, and the cleaning operation can be completed within a short period of time. In addition, the device of the present invention is simple in construction and hence can be manufactured at low cost.

While only a single preferred embodiment of the present invention has been illustrated and described, it will be apparent to those skilled in the art that various changes and modifications may be made without departing from the spirit and scope of the invention as defined in the appended claims.

What is claimed is:

1. A griddle cleaning device comprising: a brush, means for selectively supplying cleaning liquid, rinsing liquid and water to said brush, control means for controlling said supplying means to selectively and timely supply the cleaning liquid, rinsing liquid and water in a predetermined sequence, a concentration sensor means attachable to the upper surface of a griddle and connected to said control means to continuously send information indicative of concentration of the cleaning liquid on the upper surface of the griddle during water washing to the control means, said control means being operatable on the basis of the concentration information.

2. A griddle cleaning device comprising a brush having a base with an outlet opening, a multitude of bristles secured to said base, a hollow handle connected with said base and having one end in communication with said outlet opening in said base and the other end coupled with a hose, and means for selectively feeding one of a cleaning liquid, water and a rinsing liquid to said hose and, wherein said means for selectively feeding one of a cleaning liquid, water and a rinsing liquid to said hose comprises a control unit including a pump connected to said hose, a first tank for storing said cleaning liquid, a second tank for storing said rinsing liquid, said first and second tanks being connected to said pump through respective valve means, a water conduit leading from a water source to said pump and having a valve means inserted therein, a by-pass conduit leading from said water source to said hose while by-passing said water conduit and said pump, said by-pass conduit having a valve means inserted therein, and a power source and control section for controlling operations of said pump and all of said valve means.

3. A griddle cleaning device as set forth in claim 2, wherein said handle has a grip portion at which an operator grips said handle, and a cover mounted thereon so as to surround said grip portion.

4. A griddle cleaning device of claim 1 wherein said control means controls said supplying means to supply said brush firstly with the cleaning liquid in a predetermined time and then with water until the cleaning liquid concentration detected by said sensor is below a predetermined level, and finally with the rinsing liquid.

5. A griddle cleaning device of claim 1 wherein said sensor is adapted to be detachably attached to an opening through which washing liquid is drained.

6. A griddle cleaning device of claim 4 wherein said supplying means comprises a hose, a detergent tank, a rinse tank, a first conduit communicating said detergent tank with said hose, a second conduit communicating said rinse tank with said hose, and a third conduit communicating said hose with a water source, said first, second and third conduits respectively being provided with valves which are controllable by said control means.

7. A griddle cleaning device of claim 6 wherein said supplying means further comprises a by-pass conduit leading from said water source to said hose, said by-pass conduit being provided with a valve.

* * * * *